(12) United States Patent
Boardman

(10) Patent No.: US 6,318,182 B1
(45) Date of Patent: Nov. 20, 2001

(54) MEASUREMENT OF TRANSMISSION OIL PRESSURE BY MONITORING SOLENOID CURRENT

(75) Inventor: Mark D. Boardman, Portage, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/326,373

(22) Filed: Jun. 4, 1999

(51) Int. Cl.$^7$ .................................................. G01L 7/00
(52) U.S. Cl. .................................................. 73/714
(58) Field of Search .................... 73/700, 714, 40.52, 73/49.2, 116; 137/625.62, 625.64

(56) References Cited

U.S. PATENT DOCUMENTS 3,691,821 * 9/1972 Davey ..................................... 73/49.2
5,165,448 * 11/1992 Handte ............................. 137/625.64

* cited by examiner

*Primary Examiner*—William Oen
(74) *Attorney, Agent, or Firm*—Rader, Fishman & Grauer PLLC

(57) ABSTRACT

A method and apparatus for measuring hydraulic pressure in a solenoid valve includes coupling the solenoid valve with a voltage source and monitoring the input current rise characteristic as the solenoid valve moves between the open and closed positions. The rise characteristic indicates the amount of current needed to move the solenoid valve and changes when the solenoid changes positions. The current levels in the characteristic are taken at two different time periods and compared to determine whether the solenoid has shifted positions by the second time period. Because a greater amount of current is required to move the solenoid valve if the hydraulic pressure is high, the rise characteristic will change sooner if the pressure is low and later if the pressure is high. The hydraulic pressure can therefore be determined by comparing the two current levels and correlating them with pressure values. As a result, hydraulic pressure can be measured and monitored without requiring attachment of a separate pressure sensor on the solenoid valve.

8 Claims, 4 Drawing Sheets

MEASUREMENT OF TRANSMISSION OIL PRESSURE BY MONITORING SOLENOID CURRENT

TECHNICAL FIELD

The present invention relates to measurement of hydraulic pressure, and more particularly to a device that monitors solenoid current to measure hydraulic pressure without using a separate pressure sensor.

BACKGROUND ART

Automotive transmissions require adequate hydraulic pressure for reliable operation. Currently, solenoid valves are the most common way for regulating hydraulic pressure in transmissions, such as in a clutch control valve, and the pressure is measured using a pressure transducer or some other external pressure sensor attached to the solenoid valve. In a clutch control valve, for example, the hydraulic pressure indicates the force at which the clutch is engaging. The additional sensing circuitry, however, adds complexity to the automotive transmission control system. Further, adding sensors and connecting circuitry to the solenoid valves require extra parts and extra wiring, increasing the cost and complexity of the automotive transmission system.

Therefore, there is a need for a device that measures the hydraulic pressure of a solenoid valve while minimizing the extra circuitry needed to conduct the pressure measurement.

SUMMARY OF THE INVENTION

Accordingly, the present invention measures hydraulic pressure of a solenoid valve by monitoring the change in the valve's inductive characteristics as the solenoid moves. Because changes in the inductive characteristics of the solenoid valve affect the current rise profile of the solenoid, the current rise profile of the solenoid valve itself can be monitored to determine the hydraulic pressure, without using a separate pressure sensor. In one embodiment, an input voltage source is coupled to the solenoid valve, and the current rise for a given input voltage is measured over time to detect any movement in the solenoid. The solenoid will tend to move at an earlier time and reach a lower maximum current under low hydraulic pressure and at a later time and higher maximum current under high hydraulic pressure. Alternatively, or in addition, the pressure can be calculated directly from the maximum current reading. As a result, the solenoid valve itself provides information about the hydraulic pressure, without requiring the use of an additional pressure transducer or other sensor attached to the solenoid valve.

DETAILED DESCRIPTION OF THE PREFERRED EMBODIMENTS

Figure 1:
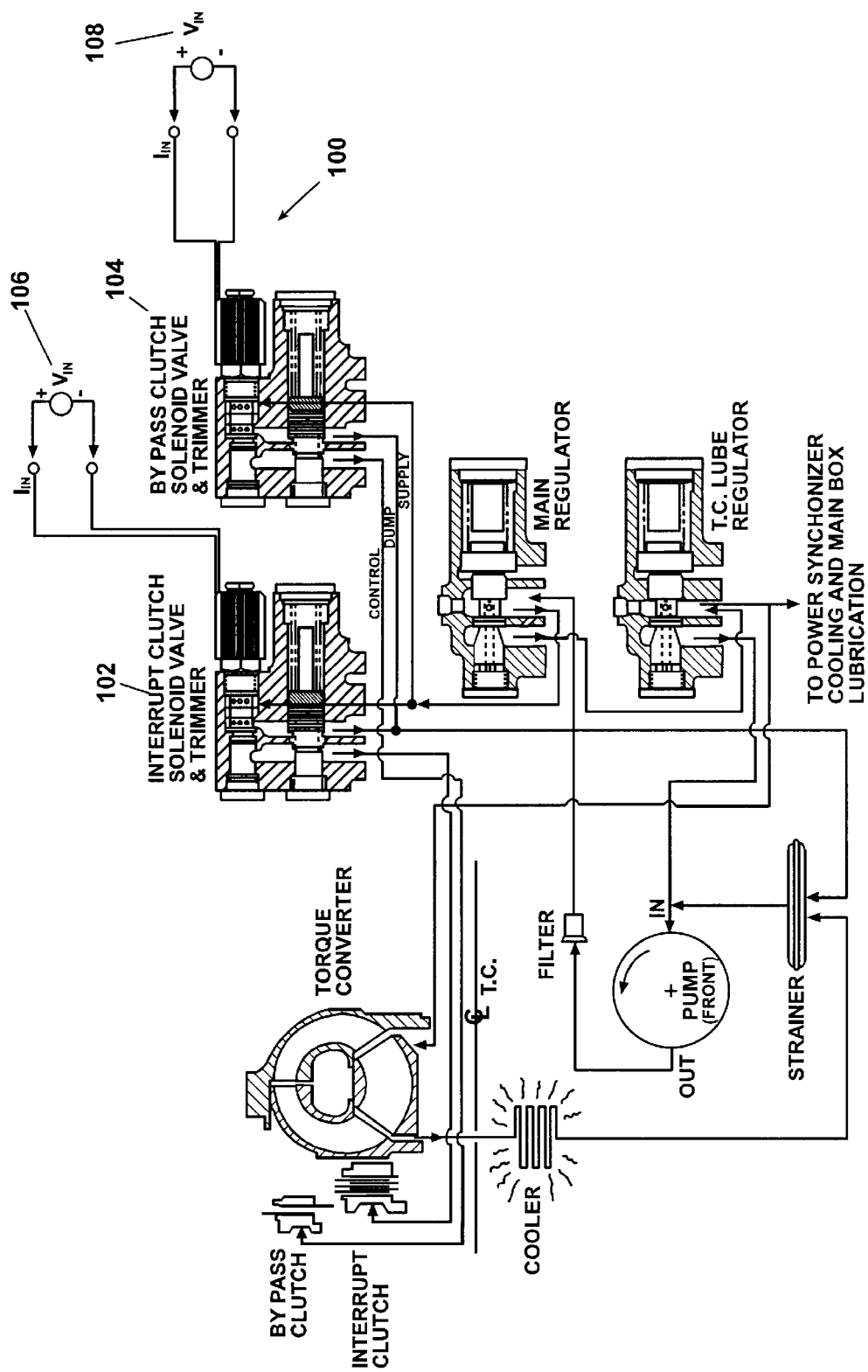
FIG. 1 is a representative diagram of an automotive transmission system having a solenoid valve pressure measurement system according to the present invention.

FIG. 1 is a representative diagram of a hydraulic circuit 100 having solenoid valves 102, 104 and electric circuitry 106, 108 for monitoring the inductive characteristics of the solenoid valves 102, 104 according to the present invention. Focusing on solenoid valve 102 for purposes of explanation, the electric circuit 106 corresponding to the solenoid valve 102 includes a voltage source $V_{in}$ 110 connected to the input side of the valve 102. An input current $I_{in}$ is drawn by the solenoid valve 102 to control the opening and closing of the valve 102. As is known in the art, the inductive characteristics of the solenoid in the solenoid valve 102 changes when the solenoid changes between the open and closed positions because the changing position of the solenoid opens/closes a magnetic loop generated by the solenoid.

More particularly, the solenoid in the solenoid valve acts as a valve actuator and works in a binary on/off fashion; the valves are either open or closed. As is known in the art, solenoid actuators contain a ferromagnetic steel rod and a coil, and electric energy, such as input current $I_{in}$, is used to create a magnetic field in the coil. When the amount of input current $I_{in}$ is adjusted, the steel rod in the coil, and therefore the solenoid, moves due to a force proportional to the applied input current I in. Because the amount of input current $I_{in}$ corresponds to the amount of force needed to move the solenoid, and because the force needed to move the solenoid depends on the hydraulic pressure of the fluid flowing through the valve, the input current $I_{in}$ level will correspond to the hydraulic pressure; the greater the pressure, the higher the current needed to move the solenoid between the open and closed positions.

Figure 2:
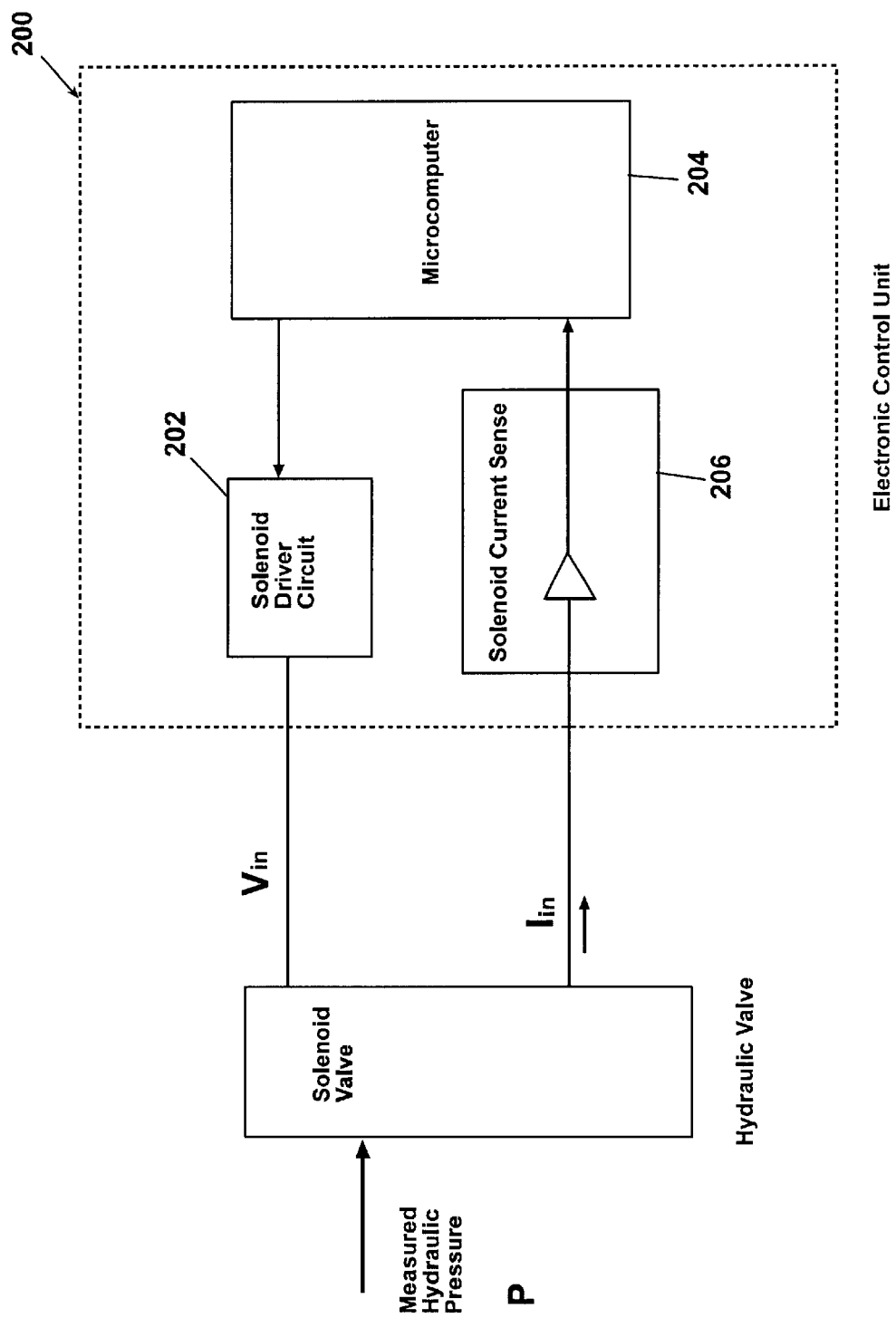
FIG. 2 is a block diagram of the pressure measurement device according to the present invention.

FIG. 2 is a block diagram illustrating the interconnection between the components of the present invention. An electronic control unit (ECU) 200 has a solenoid driver circuit 202 and a processor, such as a microcomputer 204, that controls the operation of the solenoid valves 102, 104 and monitors their operation, including the input current $I_{in}$. A solenoid current sensor 206 monitors the solenoid input current $I_{in}$ and is also coupled to a processor, such as the microcomputer 204. In one embodiment, the microcomputer 204 reads the data from the solenoid current sensor 206 and correlates the data with a pressure value and/or a determination of whether the pressure in the solenoid valve is high or low.

Figure 3A:
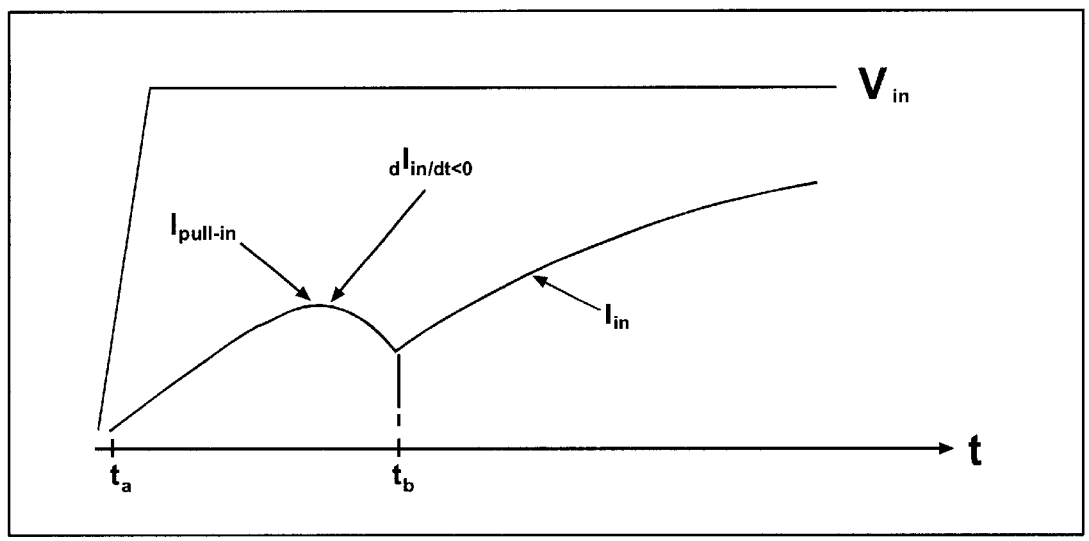
FIGS. 3A, 3B and 3C illustrate the rise characteristics of the solenoid current at different fluid pressures.
Figure 3B:
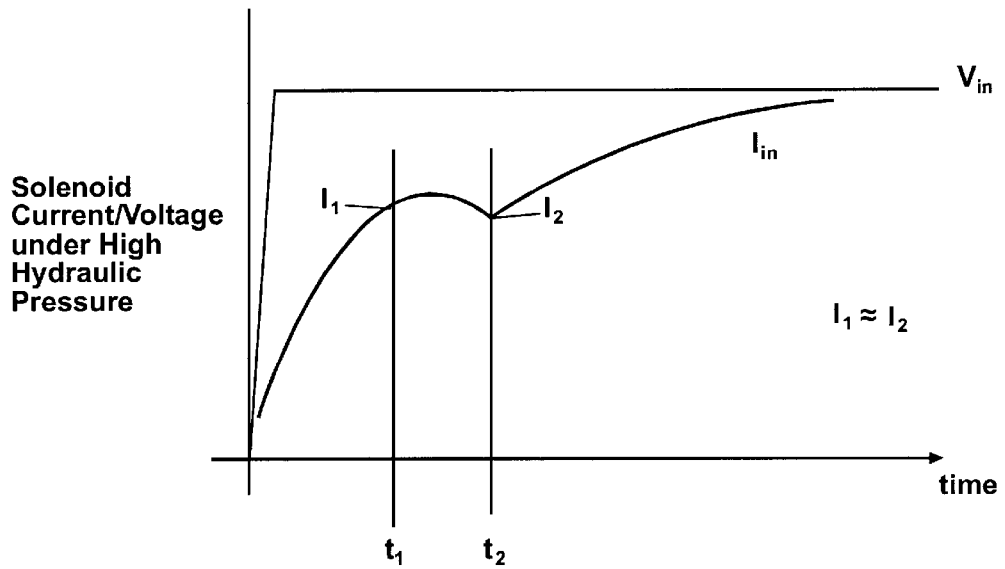
Figure 3C:
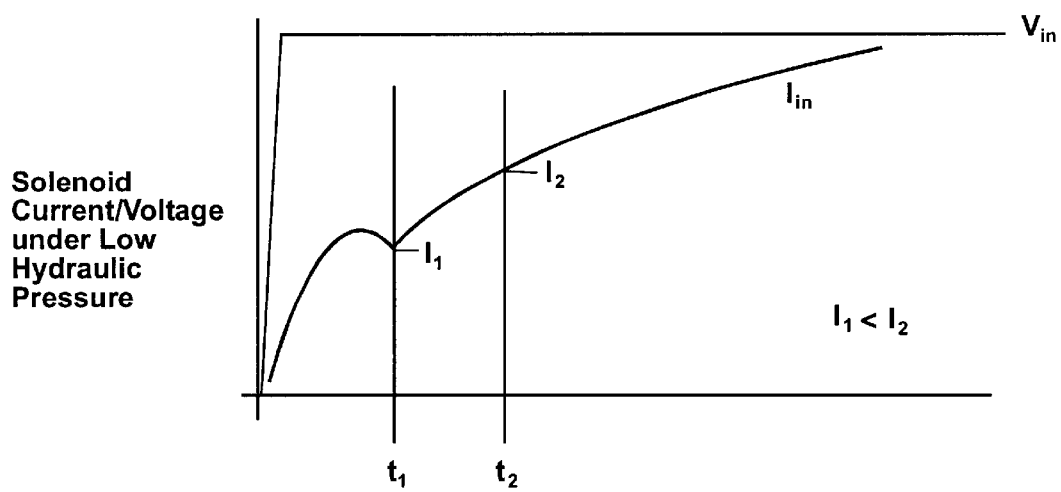

Referring to FIGS. 3A, 3B, and 3C, the inductive characteristic of the solenoid 102 affects the rise characteristic of the input current $I_{in}$. As can be seen in FIG. 2A, for example, $I_{in}$ has a first rise characteristic between time $t_a$ and $t_b$, and a second rise characteristic from time $t_b$ forward. Both the first and second rise characteristics are usually exponential curves, and a "dip" appears in $I_{in}$ between the first and second rise characteristics at time $t_b$. The first rise characteristic reaches a maximum value $I_{pull-in}$ prior to solenoid movement, which can be obtained by the microcomputer, via the solenoid current sensor 206, as the last current $I_{in}$ read after solenoid activation and before the slope of the rise characteristic $I_{in}$ ($dI_{in}/dt$) becomes less than zero. The hydraulic pressure P measured by the solenoid valve is therefore calculated by the microprocessor as:

$$P = k(I_{pull-in} - I_{ref})$$

where $I_{ref}$ is a reference current value that compensates for spring forces and internal friction in the solenoid valve and k is a constant. Alternatively, or in addition, the pressure can be determined by taking current readings from the rise characteristic at two different time periods and using the difference between the two readings to determine whether the hydraulic pressure is high or low, as will be explained in greater detail below.

FIG. 3B is an example of a rise characteristic at a high hydraulic pressure, while FIG. 3C is an example of a rise characteristic at a low hydraulic pressure. To determine whether the hydraulic pressure is high or low, the level of input current $I_{in}$ can be taken at a first time $t_1$ and a second time $t_2$ to obtain current levels $I_1$ and $I_2$, respectively. Times $t_1$ and $t_2$ can be selected randomly, especially if the measurement device is to be used to measure qualitative differences between valve pressures rather than determining a specific pressure value. As can be seen in the figures, a higher hydraulic pressure requires more time and a higher current level before the solenoid can overcome the higher pressure and move to a different position because the high pressure of the fluid tends to keep the solenoid at one position until there is sufficient current to move the solenoid. By contrast, as shown in FIG. 3C, less current and less time is required to move the solenoid valve when the hydraulic pressure is low because the solenoid does not have to overcome as much fluid force before it is able to move to its new position.

The microcomputer 204 and solenoid current sensor 206 can be used to monitor the current levels $I_1$ and $I_2$, determine when the solenoid starts to move by calculating the difference between $I_1$ and $I_2$, and correlate the difference with the hydraulic pressure. More particularly, the microprocessor can monitor the current rise in the inductive characteristic and take a reading of $I_1$ and $I_2$ at selected times $t_1$, and $t_2$, respectively. If the hydraulic pressure is high, the current readings at $t_1$ and $t_2$ will be about the same because the high pressure prevents the solenoid from moving any significant amount between times $t_1$ and $t_2$, as shown in FIG. 3B. However, if the hydraulic pressure is low, the current reading $I_2$ taken at time $t_2$ will be significantly higher than the current reading $I_1$ taken at time $t_1$, as shown in FIG. 3C, because the solenoid has already overcome the fluid pressure and has entered its second inductive characteristic at time $t_2$. In short, the invention monitors fluid pressure by detecting whether the solenoid starts to move at a low current or at a high current. As a result, the pressure determination is conducted using a solenoid that already exists in the automobile transmission, without requiring a secondary sensor attached to the solenoid valve. The hydraulic pressure of the fluid flowing through the solenoid valve is measured by the solenoid valve itself, rather than by an external pressure transducer or other pressure sensor. Further, because the input current Iin of the solenoid is already monitored in the automotive system for other reasons and applications, taking the current readings and correlating them with hydraulic pressure does not require any additional complicated signal processing, sensors, wires, or circuits.

The present invention is not limited for use in automotive transmissions, but can be used in any application having a solenoid valve and a pressure sensor. By removing the pressure sensor and monitoring input current according to the present invention, the solenoid acts as both a solenoid and as a pressure sensor. It should be understood that various alternatives to the embodiments of the invention described herein may be employed in practicing the invention. It is intended that the following claims define the scope of the invention and that the method and apparatus within the scope of these claims and their equivalents be covered thereby.

What is claimed:

1. An apparatus for monitoring fluid pressure, comprising:
 a solenoid valve actuatable by an input current;
 a voltage source coupled to the solenoid valve to generate the input current, the input current having a rise characteristic corresponding to a force required to move the solenoid valve; and
 a processor that correlates the rise characteristic with the fluid pressure.

2. The apparatus of claim 1, wherein the solenoid valve includes a valve portion and an actuator portion, and wherein the voltage source is coupled to the actuator portion in the solenoid valve to send the input current to the actuator portion for actuating the valve portion.

3. The apparatus of claim 1, wherein the rise characteristic has a first rise characteristic when the solenoid valve is at a first position and a second rise characteristic when the solenoid has moved to a second position, and wherein the processor obtains the fluid pressure by calculating a difference between a pull-in current value, which is a maximum current value in the first rise characteristic, and a reference current value and multiplying the difference by a predetermined constant.

4. The apparatus of claim 1, wherein the rise characteristic has a first rise characteristic when the solenoid valve is at a first position and a second rise characteristic when the solenoid has moved to a second position, and wherein the processor obtains the fluid pressure by taking a first current reading at a first time and a second current reading at a second time, calculating the difference between the first and second current readings, and correlating the difference with a pressure determination.

5. A method for monitoring fluid pressure in a solenoid valve, comprising the steps of:
 applying an input current to the solenoid valve, wherein the input current controls actuation of the solenoid valve;
 monitoring an input current rise characteristic corresponding to a force required to move the solenoid valve; and
 correlating the rise characteristic with the fluid pressure.

6. The method of claim 5, wherein the step of applying an input current includes coupling a constant voltage source to the solenoid valve to generate the input current.

7. The method of claim 5, wherein the rise characteristic has a first rise characteristic when the solenoid valve is at a first position and a second rise characteristic when the solenoid has moved to a second position, and wherein the correlating step includes the steps of:
 calculating a difference between a pull-in current value, which is a maximum current value in the first rise characteristic, and a reference current value; and
 multiplying the difference by a predetermined constant to obtain the fluid pressure.

8. The method of claim 5, wherein the rise characteristic has a first rise characteristic when the solenoid valve is at a first position and a second rise characteristic when the solenoid has moved to a second position, and wherein the correlating step includes the steps of:
 taking a first current reading at a first time;
 taking a second current reading at a second time;
 calculating the difference between the first and second current readings; and
 correlating the difference with the fluid pressure.

* * * * *